Sept. 3, 1957 M. R. KAHL ET AL 2,804,768
CAPACITY TEST WHEEL FOR AIR CONDITIONERS
Filed March 24, 1954 4 Sheets-Sheet 1

Inventors
Melvin R. Kahl
Frederick T. Appel
Paul O. Pippel
Atty.

Sept. 3, 1957  M. R. KAHL ET AL  2,804,768
CAPACITY TEST WHEEL FOR AIR CONDITIONERS
Filed March 24, 1954  4 Sheets-Sheet 3

Inventors
Melvin R. Kahl
Frederick T. Appel
Paul O. Pippel
Atty.

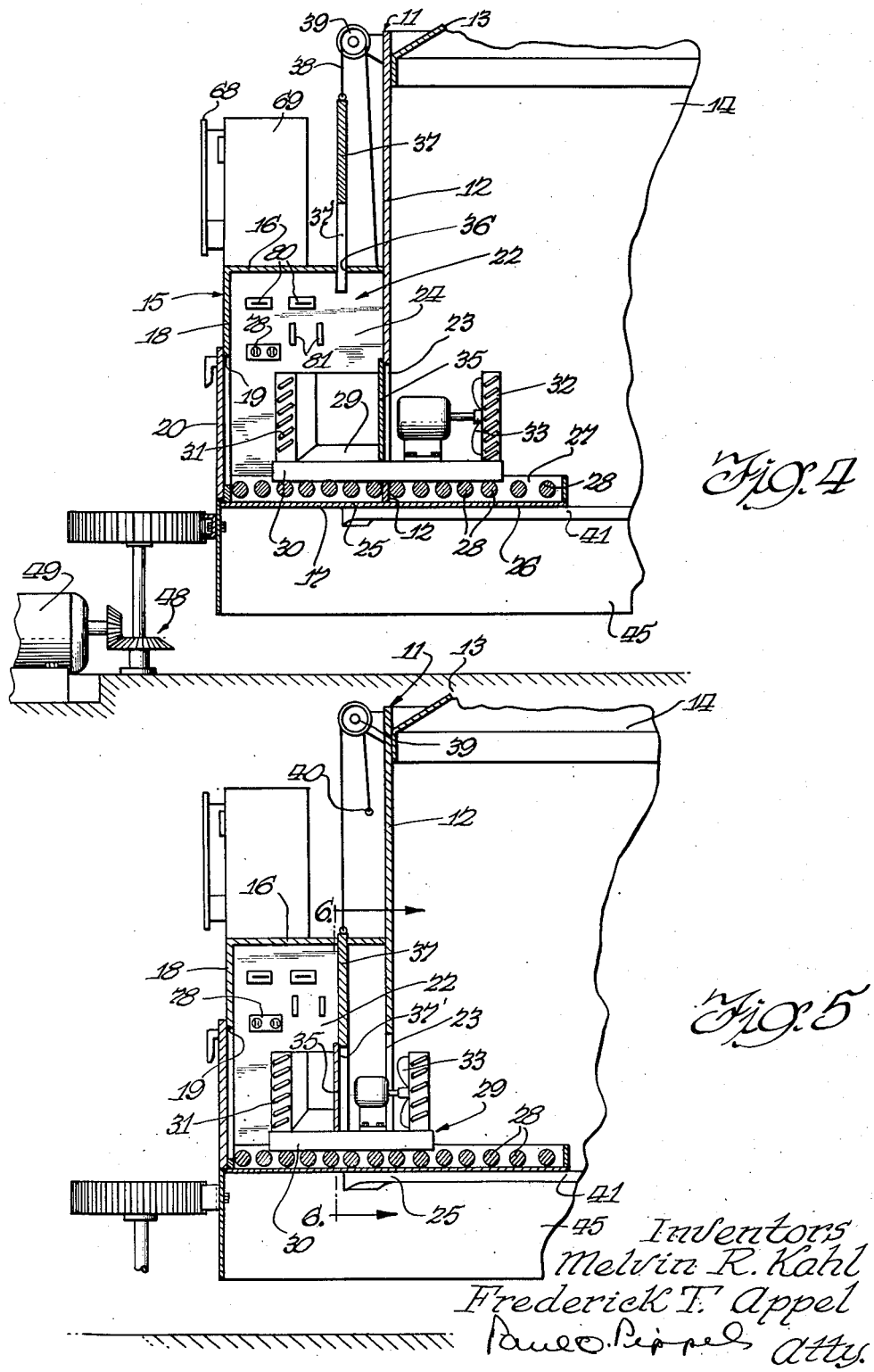

_United States Patent Office_

2,804,768
Patented Sept. 3, 1957

2,804,768

CAPACITY TEST WHEEL FOR AIR CONDITIONERS

Melvin R. Kahl and Frederick T. Appel, Evansville, Ind., assignors, by mesne assignments, to Whirlpool-Seeger Corporation, a corporation of Delaware Application March 24, 1954, Serial No. 418,421

10 Claims. (Cl. 73—15)

This invention relates to an improvement in testing devices for air conditioners. More specifically the invention relates to a testing unit for measuring the capacity of an air conditioner.

In order to insure quality in air conditioning units it is desirable to test each air conditioner individually after it is discharged from the assembly line. This generally has created significant problems since the test must be conducted over a given period, and generally testing procedures have been unable to keep pace with the production of air conditioners. It is a prime object of this invention therefore, to provide an improved testing unit for air conditioners or refrigerators which will permit the testing of these units in large quantities with a minimum necessary attendance and supervision.

It is still another object to provide an improved testing device for room air conditioners, the device including provisions wherein a large number of conditioners may be tested under conditions simulating the environment within which the conditioners may be utilized.

A still further object is to provide an improved testing device for air conditioners including a test wheel containing a large number of test compartments, the wheel being rotatable about its axis so that the air conditioners may be loaded at one position, rotated with the wheel during a given period of time, and unloaded at the same position.

Still another object is to provide an improved test unit for testing air conditioners comprising a casing having a heat dissipating chamber which is heated from the condenser of the air conditioner and a test chamber which is cooled by the evaporating unit of the air conditioner, the test chamber being provided with heating elements which supply the heat which is removed by the air conditioning unit.

Further specific objects of the invention will become more readily apparent from a reading of the specification when examined in connection with the accompanying sheets of drawings:

In the drawings, Figure 1 is a cross-sectional view, in elevation, of an improved testing unit for air conditioners;

Figure 4 is a cross-sectional view of a portion of a test unit taken substantially along the line 4—4 of Figure 2;

Figure 5 is a view similar to Figure 4 showing a modified test arrangement for an air conditioning test unit.

Figure 1:
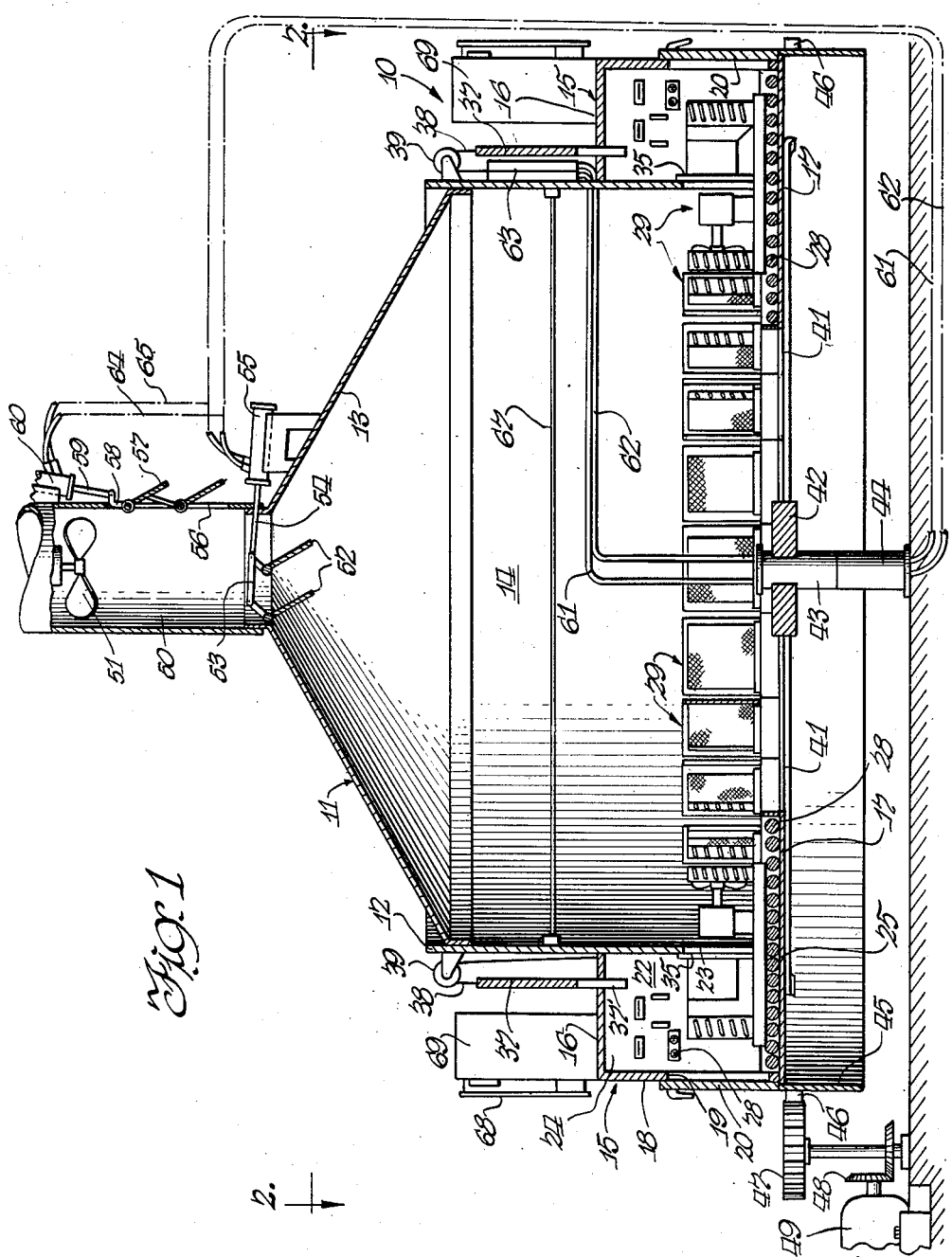
Figure 2:
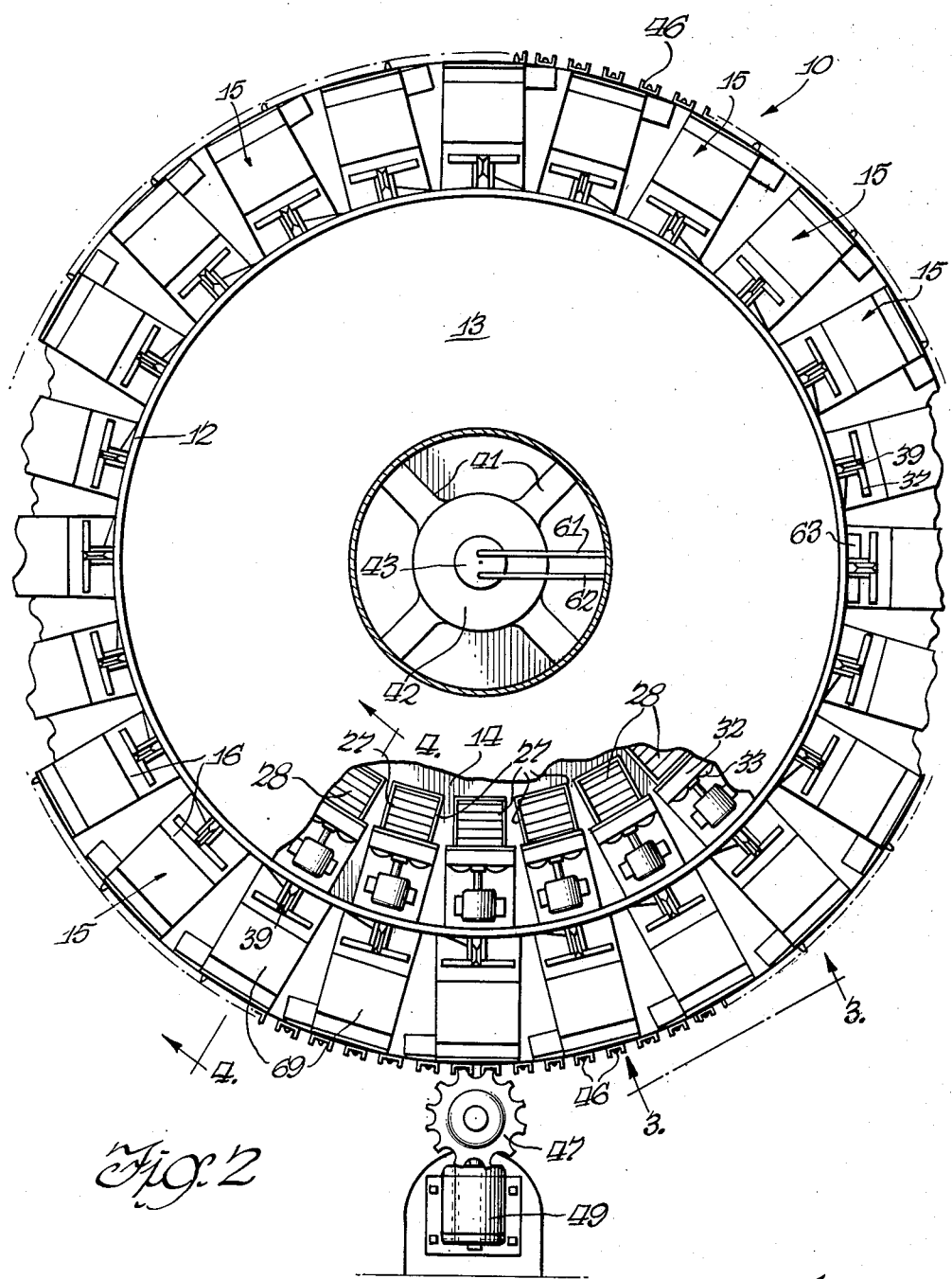
Figure 2 is a plan view, with a portion broken away, of a test unit taken along the line 2—2 of Figure 1.

A capacity test unit for air conditioners, refrigerators and the like is generally designated by the reference character 10. The unit 10 comprises an annular upright casing 11 having a cylindrical wall 12. The upper end of the casing 11 is closed by means of a frusto-conical upper wall 13 connected to the cylindrical wall 12. A heat dissipating chamber 14 is provided within the casing 11. A plurality of test compartments 15 are supported in spaced relation on the annular casing 11.

Each test compartment comprises an upper wall 16. A floor panel generally designated at 17 extends horizontally inwardly adjacent the lower end of the wall 12. A front wall 18 is provided with a loading opening 19 which may be closed by means of a loading door or closure member 20 suitably hinged as indicated at 21 in Figure 3. A rear wall for each test compartment 15 is provided by a part of the wall 12. The interior of each test compartment 15 is provided with a test chamber or cell 22. An opening 23 provided in the cylindrical wall 12 may be in communication with the heat dissipating chamber 14 and the test chamber 22. The test compartment 15 is also provided with side walls 24 and a part of the panel 17 provides a bottom wall 25. As indicated at 26 the bottom wall 25 also extends into the heat dissipating chamber 14. Laterally spaced side supports 27 suitably support a plurality of spaced conveyor rolls 28 on which an air conditioner or refrigerating unit 29 may be positioned. As indicated in Figures 4 and 5, each air conditioner or refrigerating unit 29 which may be tested on the unit 10 includes a base 30 on which an evaporator 31 and a condenser 32 is positioned. A fan 33 is in conventional relation with respect to the condenser 32. The evaporator 31 and condenser 32 are horizontally spaced and a partition 35 is positioned between them, being supported on the base 30. The partition 35 is of conventional design and construction and is found in most conventional air conditioners. The partition 35 is normally the baffle which seals the edges of a window casing after the air conditioner has been placed in position and installed on the window frame. The partition 35 therefore also serves a similar purpose in the present instance as will appear from the operation.

Figure 3:
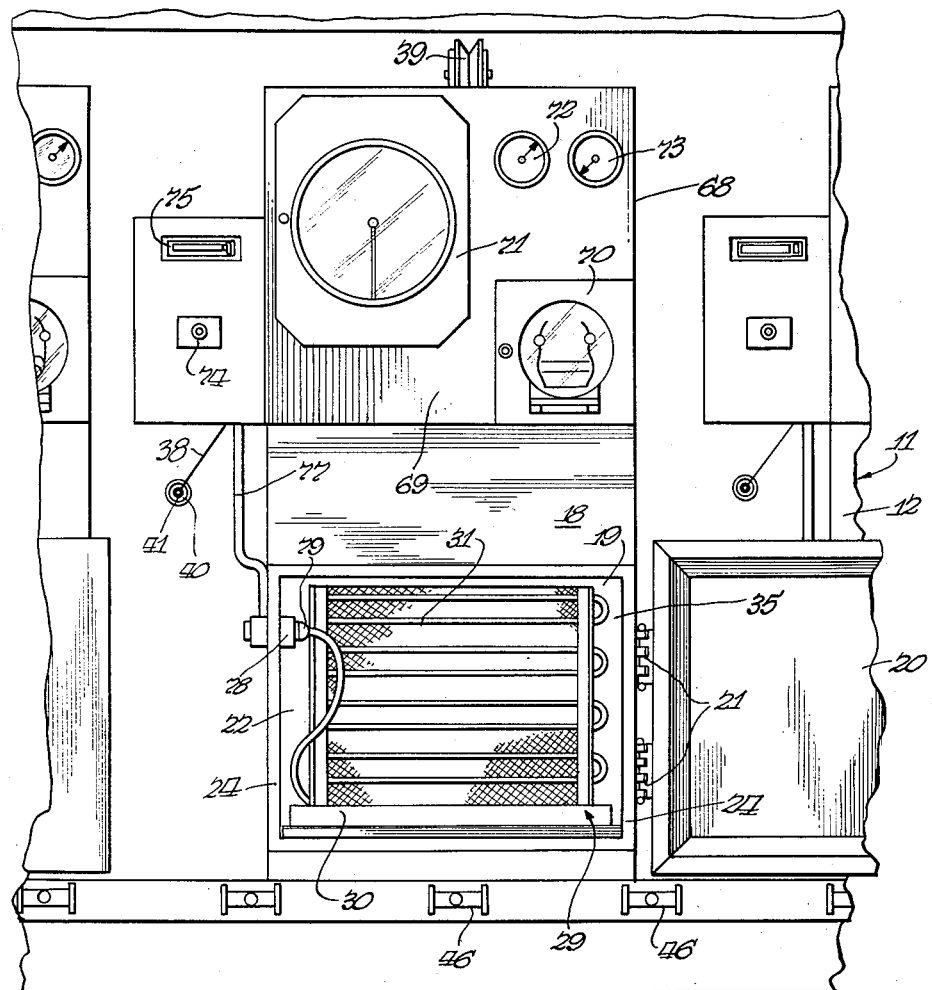
Figure 3 is a detailed front view of certain electrical controls of a test unit for air conditioners, taken along the line 3—3 of Figure 2.
Figure 6:
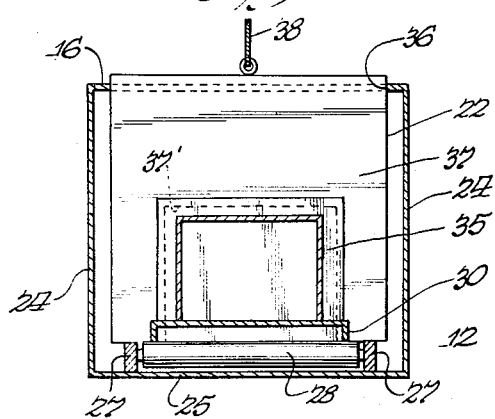
Figure 6 is a cross-sectional view of certain details, the view being taken along the line 6—6 of Figure 5.

Referring now particularly to Figures 4, 5 and 6 a laterally extending slot 36 is provided in the upper wall 16. Within the slot 36, there is provided in relative sliding relation, a panel 37 having a generally U-shaped opening 37'. The panel 37 may be raised and lowered into the chamber 22, and has connected thereto a flexible element 38 which is entrained around a pulley 39. A hook element 40, connected to the flexible element 38, may suitably engage a pin 41 in the wall 12, as indicated in Figure 3, for maintaining the panel 37 in the raised position indicated particularly in Figure 4.

The testing unit 10 also is provided with a plurality of spider arms 41 which are connected at their inner ends to a hub 42. The hub 42 is connected to a rotatable sleeve 43 which may be rotatably supported on a number of bearing elements (not shown) which are provided in the bearing support 44. The outer ends of the spider arms 41 are connected to an annular skirt 45. The annular skirt 45 is rigidly connected to the annular casing 11. A plurality of circumferentially extending channel shaped brackets 46 are connected to the skirt 45. The brackets 46 are engaged in driven relation by means of a sprocket 47 which is rotated by means of a beveled gear drive 48. A suitable power unit 49 is provided to drive the beveled gear drive 48. The test unit 10 can thus be rotated about a vertical axis by means of the power unit 49. It must be understood, of course, that any suitable drive means for effectuating this purpose may be provided.

Means for removing heated air from the chamber 14 is provided in the form of an exhaust duct 50 which is at its lower end in communication with the dissipating chamber 14. The exhaust duct 50 is provided with an exhaust fan 51 which may be driven in any conventional manner. Louvers 52 are provided within the lower end of the exhaust duct 50, the said louvers 52 being arranged to close the duct with respect to the chamber 14. Suitable linkage 53 connects the louvers 52 to a piston rod 54 which in turn is actuated within an air cylinder 55. Adjacent the louvers 52 there is provided a by-pass opening 56 which is regulated by means of louvers 57. The louvers 57 are connected by means of a link 58 to a piston rod 59 which is actuated within an air cylinder 60.

Compressed air lines 61 and 62 are connected to a control box 63, having suitable controls (not shown). The air lines 61 and 62 extend through the sleeve 43 and through the bearing support 44 emerging at the lower end of said support 44 as indicated in Figure 1. Suitable swivel joints (not shown) are provided within the rotatable sleeve 43 to permit rotation of the lines 61 and 62 which are positioned within the chamber 14, relative to the lines 61 and 62 which extend from the bottom of the sleeve 44. The lines 61 and 62 are connected to the air cylinder 55 and lines 64 and 65 connect lines 61 and 62 with the air cylinder 60. An elongated temperature control bulb 67 is connected to the control box 63.

Each test compartment 15 is provided, as indicated in Figure 3, with an electrical control panel 68. The panel 68 is positioned on an electrical control box 69 containing the necessary wiring, switches, etc. for actuating the test elements and units described. Each control panel 68 is provided with a watt-hour meter 70, a cabinet temperature recorder 71, a 15 minute timer 72 and a one hour timer 73. A starting switch 74 is also provided. A watt-hour meter counter 75 is suitably connected to the watt-hour meter 70. A conduit 77 extends from the control box 69 to a plug-in connection 78. The plug-in connection 78 is of the dual type as best indicated in Figure 4 and thus may accommodate different size air conditioning units. The lead 79 from an air conditioner 29, as indicated in Figure 3, may be plugged into the plug-in connection 78 for actuating the unit. The test chamber 22 is also provided with electrical heaters 80 and thermostats 81. The thermostats 81 are suitably connected to control the current supply to the heating elements 80 so that a constant temperature may be held within the test chamber 22.

In the operation, the test unit 10 is driven or rotated at a speed which represents the intended test period. Thus, air an air conditioning unit 29 which is inserted into a chamber will go through its test period and when it is completed will be at the loading position whereupon it can be removed and another air conditioner put into its place. Since the test periods and procedures for each air conditioning unit are the same, it is necessary to describe only one such test operation. It is of course, obvious that the electrical parts such as the heaters 80 and thermostats 81 are interconnected and such interconnection of the electrical elements are suitably accomplished within the control box 69. It is not deemed necessary to specifically disclose the exact wiring connections and circuits since this is within the province of a skilled electrician.

The air conditioning unit 29 is rolled through the loading opening 19, on the roller conveyors 28, into the position indicated in Figure 4. In this position the condenser 32 is disposed within the heat dissipating chamber 14 and the evaporator 31 is positioned within the test chamber 22. The partition 35 is positioned in snug relation with respect to the wall 12 so that it covers the opening 23 and thus the chamber 22 is suitably sealed with respect to the heat dissipating chamber 14. In this position now, the lead 79 is plugged into the plug-in connection 78. The door 20 is now closed and the master switch 74 is closed which starts the air conditioning unit and the testing sequence. The air conditioning unit is first given a leveling out period of approximately ten minutes which is controlled by the timer 72. During this period of time, the temperature in the chamber will equalize and the heating elements as controlled by the thermostats 81, will maintain the test chamber at a temperature of around 80 degrees F. After the leveling out period has expired the one hour timer 73 will start the actual test period. This timer 73 is in circuit with the watt-hour meter 70 and the electrical heating elements 80. Thus, the current delivered to the heating elements 80 is measured by means of the watt-hour meter 70. The watt-hour meter 70 is of a conventional cyclometer type which will send out an electrical impulse at the completion of every 10 watt hours. The impulses which are sent out by the meter 70 are recorded on the counter 75. The counter reading can easily be translated into heat units and thus, it is simple to determine whether or not the unit under test has removed the specified amount of heat from the test chamber 22 within a given time. Thus, when the air conditioner 29 is brought back to the original position for removal from the test unit, it can be quickly determined whether or not the unit is satisfactory and has removed the required units of heat from the test chamber 22.

In order to secure consistent test conditions which will permit each air conditioner to be tested in the same environment it is necessary to keep the heat dissipating chamber 14 at a certain temperature. The chamber 14 is, of course, open at its bottom or is in communication with the atmosphere by means of the skirt 45 which is also open at its lower end. Thus, fresh air can enter into the chamber 14. It is however, desirable to keep the air within the air chamber 14 at a certain temperature. This is accomplished by means of the exhaust conduit 50.

The fan 51 is of a constantly operating type which will remove heated air from the chamber 14. When it is desired to remove heated air from the chamber 14, an increase of the temperature within the chamber 14 will be reflected in the temperature control bulb which actuates the control unit 63 whereupon air under pressure is supplied to the air cylinder 55 and the louvers 52 are moved to the open position. Likewise air under pressure is supplied to the cylinder 60 whereupon the louvers 57 are moved to a closed position. The exhaust fan 51 now quickly removes an amount of heated air from the chamber 14 and when the temperature in the chamber 14 is lowered sufficiently, the control bulb 67 reflects this result so that the controller 63 controls air under pressure to the cylinder 55 to close the louvers 52. Simultaneously the louvers 57 are opened and by-pass of air takes place through the conduit 50. Thus it can be seen that the chamber 14 will be maintained under a constant temperature so that the operating test conditions of the test device will be consistent.

It will be noted that the air conditioning unit 29 shown in Figure 5 is considerably smaller than the air conditioning unit shown in Figure 4. The units may be identical except for size and capacity. Thus, the same reference characters have been applied. In testing a smaller unit of the type shown in Figure 5, a much smaller chamber 22 is necessary. This is accomplished by merely dropping the panel 37 so that the opening 37' straddles the smaller air conditioning unit 29. The partition 35 fits over the opening 37' to suitably seal the smaller chamber 22. The test operation for the smaller size air conditioner is similar to the operation above described and need not be reiterated. Thus, it can also be seen that the test unit will accommodate different size air conditioners by dropping the panel 37 so that a smaller test chamber, in keeping with the smaller air conditioner, is provided.

It can now be seen that an efficient mass air conditioning testing unit has been provided. Thus large quantities of conditioners may be tested under identical conditions and testing of the conditioners can be placed in concert with their removal from the assembly line. It must be realized that this unit can be utilized for any type of refrigerating unit utilizing an evaporator and condenser wherein one chamber may be heated and another chamber may be cooled. It must be understood that changes and modifications may be made which do not depart from the spirit of this invention as disclosed nor the scope thereof as defined in the appended claims.

What is claimed is:

1. A testing device for mechanical cooling units comprising an annular casing having a bottom opening, a frusto-conical upper wall enclosing said casing to define a heat-dissipating chamber, means supporting said casing for rotation about a vertical axis, drive means connected to said casing for rotating the same, a plurality of test compartments mounted on said casing in circumferentially disposed relation, each test compartment having a test chamber including a front wall having a loading opening and a rear wall having a rear opening in communication with said heat-dissipating chamber, a door for said loading opening, a floor in said compartment including a conveyor adapted to position a cooling unit having an evaporator and a condenser within said chambers, the evaporator and condenser being separated by an upright partition, the said partition being engageable with the rear wall in sealing relation with said rear opening to position the condenser in said dissipating chamber and the evaporator in said test chamber, an electrical plug-in connection in said test compartment for supplying electrical current to the cooling unit, an electrical heating element within the test chamber for heating said chamber to a predetermined temperature, a heat-responsive element in said test chamber for regulating said heating element, means for measuring the electrical current supplied to said heating element, an air outlet connection connected to the upper wall of said casing, said connection comprising a conduit having a first opening in communication with said dissipating chamber and a second by-pass opening adapted to communicate externally of said conduit, a first movable closure member over said first opening, a second movable closure member over said second opening, exhaust fan means connected to said conduit, and temperature-responsive means within said dissipating chamber connected to said first and second closure members whereby said closure members are alternately opened and closed and during the open position of said first closure means air is removed from said dissipating chamber.

2. A testing device for mechanical cooling units comprising an annular casing having a bottom opening, an upper wall enclosing said casing to define a heat-dissipating chamber, means supporting said casing for rotation about a vertical axis, drive means connected to said casing for rotating the same, a plurality of test compartments mounted on said casing in circumferentially disposed relation, each test compartment having a test chamber including a front wall having a loading opening and a rear wall having a rear opening in communication with said heat-dissipating chamber, a door for said loading opening, a floor in said compartment including a conveyor adapted to position a cooling unit having an evaporator and a condenser within said chambers, the evaporator and condenser being separated by an upright partition, the said partition being engageable with the rear wall in sealing relation with said rear opening to position the condenser in said dissipating chamber and the evaporator in said test chamber, an electrical plug-in connection in said test compartment for supplying electrical current to the cooling unit, an electrical heating element within the test chamber for heating said chamber to a predetermined temperature, a heat-responsive element in said test chamber for regulating said heating element, means for measuring the electrical current supplied to said heating element, an air outlet connection connected to the upper wall of said casing, said connection comprising a conduit having a first opening in communication with said dissipating chamber and a second by-pass opening adapted to communicate externally of said conduit, a first movable closure member over said first opening, a second movable closure member over said second opening, first and second actuating means connected to said first and second closure members, exhaust means connected to said conduit, and temperature-responsive means within said dissipating chamber connected to said first and second actuating means for moving the same to move said closure members whereby said closure members are alternately opened and closed and during the open position of said first closure means air is removed from said dissipating chamber.

3. A testing device for mechanical cooling units comprising a casing, an upper wall enclosing said casing to define a heat-dissipating chamber, means supporting said casing for rotation about a vertical axis, drive means connected to said casing for rotating the same, a plurality of test compartments mounted on said casing in circumferentially disposed relation, each test compartment having a test chamber including a front wall having a loading opening and a rear wall having a rear opening in communication with said heat-dissipating chamber, a door for said loading opening, a floor in said compartment adapted to position a cooling unit having an evaprorator and a condenser within said chambers, the evaporator and condenser being separated by an upright partition, the said partition being engageable with the rear wall in sealing relation with said rear opening to position the condenser in said dissipating chamber and the evaporator in said test chamber, electrical means in connection with the test compartment for supplying electrical current to the cooling unit, an electrical heating element within the test chamber for heating said chamber to a predetermined temperature, a heat-responsive element in said test chamber for regulating said heating element, means for measuring the electrical current supplied to said heating element, an air outlet connection connected to the upper wall of said casing, said connection comprising a conduit having a first opening in communication with said dissipating chamber and a second by-pass opening adapted to communicate externally of said conduit, a first movable closure member over said first opening, a second movable closure member over said second opening, and temperature-responsive actuating means within said dissipating chamber connected to said first and second closure means whereby said closure means are alternately opened and closed and during the open position of said first closure means air is removed from said dissipating chamber.

4. A test device for mechanical cooling units comprising a casing having an atmosphere inlet, said casing defining a heat-dissipating chamber, means supporting said casing for rotation about a vertical axis, drive means connected to said casing for rotating the same, a plurality of test compartments mounted on said casing in circumferentially disposed relation, each test compartment having a test chamber including a front wall having a loading opening and a rear wall having a rear opening in communication with said heat-dissipating chamber, a closure member for said loading opening, a floor in said compartment including a conveyor adapted to position a cooling unit having an evaporator and a condenser with said chambers, the evaporator and condenser being separated by an upright partition, the said partition being engageable with the rear wall in sealing relation with said rear opening to position the condenser in said dissipating chamber and the evaporator in said test chamber, electrical means connected to said test compartment for supplying electrical current to the cooling unit, a heating element with the test chamber for heating said chamber to a predetermined temperature, a heat-responsive element in said test chamber for regulating said heating element, means for measuring the electrical current supplied to said heating element, an air outlet connection on said dissipating chamber, exhaust means connected to said air outlet connection, and temperature-responsive means within said dissipating chamber connected to said outlet connection for regulating the discharge of air therethrough.

5. A testing device for electrical cooling units comprising a casing defining a heat-dissipating chamber, means supporting said casing for rotation, drive means connected to said casing for rotating the same, a plurality of test compartments mounted on said casing in circumferentially disposed relation, each test compartment having a test chamber including a front wall having a loading opening and a rear wall having an opening in communication with said heat-dissipating chamber, a closure member manually positioned relative to said loading opening, means in said compartment adapted to position a cooling unit having an evaporator and a condenser within said chambers, the evaporator and condenser being separated by an upright partition, the said partition being engageable with the rear wall in sealing relation with said rear opening to position the condenser in said dissipating chamber and the evaporator in said test chamber, electrical means connected to said test compartment for supplying electrical current to the cooling unit, an electrical heating element within the test chamber for heating said chamber to a predetermined temperature, a heat-responsive element in said test chamber for regulating said heating element, means for measuring the electrical current supplied to said heating element, an air outlet connection connected to the heat-dissipating chamber, and temperature-responsive actuating means for dissipating warm air from the heat-dissipating chamber through said air outlet connection.

6. A testing device for electrical cooling units comprising a casing defining a heat-dissipating chamber, means supporting said casing for rotation, drive means connected to said casing for rotating the same, a plurality of test compartments mounted on said casing in circumferentially disposed relation, each test compartment having a test chamber including a front wall having a loading opening and a rear wall having an opening in communication with said heat-dissipating chamber, a closure member movably positioned relative to said loading opening, means in said compartment adapted to position a cooling unit having an evaporator and a condenser within said chambers, the evaporator and condenser being separated by an upright partition, the said partition being engageable with the rear wall in sealing relation with said rear opening to position the condenser in said dissipating chamber and the evaporator in said test chamber, electrical means for supplying electrical current to the cooling unit, an electrical heating element for heating said chamber to a predetermined temperature, a heat-responsive element in said test chamber for regulating said heating element, means for measuring the electrical current supplied to said heating element, and an air exhaust connection connected to the heat-dissipating chamber.

7. A testing device for electrical cooling units comprising a casing defining a heat-dissipating chamber, means supporting said casing for rotation, drive means connected to said casing for rotating the same, a plurality of test compartments mounted on said casing in circumferentially disposed relation, each test compartment having a test chamber including a front wall having a loading opening and a rear wall having an opening in communication with said heat-dissipating chamber, a closure member movably positioned relative to said loading opening, means supporting a cooling unit in the test compartment, the cooling unit including an evaporator and a condenser and an upright partition therebetween, the said partition being engageable with the rear wall in sealing relation with said rear opening to position the condenser in said dissipating chamber and the evaporator in said test chamber, electrical means for supplying electrical current to the cooling unit, an electrical heating element for heating said chamber to a predetermined temperature, a heat-responsive element in said test chamber for regulating said heating element, means for measuring the electrical current supplied to said heating element, and an air outlet exhaust means on said casing in communication with the dissipating chamber for discharging, at intervals, heated air from the dissipating chamber.

8. In a testing device for electrically driven, mechanical air cooling units, the combination of a support with a rotatable member mounted on said support to rotate about a vertical axis, a central casing carried by said rotatable member, said casing being open at the bottom and having a tapered hood leading to an upper air discharge port, air circulating means for drawing air in at the bottom of said casing and forcing air out of said discharge port, temperature responsive means in said casing subjected to the air temperature therein, damper means in said discharge port controlled by said temperature responsive means in such manner as to cause the damper opening to be regulated to maintain the air temperature in said casing between predetermined limits, a multiplicity of separate outer housing members arranged in a circle on said rotatable member and forming test chambers with said casing and communicating with said central casing through individual window openings, a support for each of said test chambers facilitating the insertion of an air cooling unit to be tested into each chamber with its condenser in said central casing and its evaporator in said test chamber, and the window opening sealed against leakage, an electrical heater for each test chamber, and meter means for measuring the electrical input to each heater, and meter means for measuring the electrical input for driving each cooling unit, to determine the efficiency of each separate cooling unit.

9. In a testing device for electrically driven, mechanical air cooling units, the combination of a support with a rotatable member mounted on said support to rotate about a vertical axis, a central casing carried by said rotatable member, said casing being open at the bottom and having a tapered hood leading to an upper air discharge port, air circulating means for drawing air in at the bottom of said casing and forcing air out of said discharge port, temperature responsive means in said casing subjected to the air temperature therein, damper means in said discharge port controlled by said temperature responsive means in such manner as to cause the damper opening to be regulated to maintain the air temperature in said casing between predetermined limits, a multiplicity of separate outer housing members arranged in a circle on said rotatable member and forming test chambers with said casing and communicating with said central casing through individual window openings, a support for each of said test chambers facilitating the insertion of an air cooling unit to be tested into each chamber with its condenser in said central casing and its evaporator in said test chamber, and the window opening sealed against leakage, an electrical heater for each test chamber, and meter means for measuring the electrical input to each heater, and meter means for measuring the electrical input for driving each cooling unit, to determine the efficiency of each separate cooling unit, said meter means including automatic recording devices for each chamber, and said rotatable member having a common loading and unloading point for inserting the units to be tested and removing those that have been tested.

10. In a testing device for electrically driven, mechanical air cooling units, the combination of a support with a rotatable member mounted on said support to rotate about a vertical axis, a central casing carried by said rotatable member, said casing being open at the bottom and having a tapered hood leading to an upper air discharge port, air circulating means for drawing air in at the bottom of said casing and forcing air out of said discharge port, temperature responsive means in said casing subjected to the air temperature therein, damper means in said discharge port controlled by said temperature responsive means in such manner as to cause the damper opening to be regulated to maintain the air temperature in said casing between predetermined limits, a multiplicity of separate outer housing members arranged in a circle on said rotatable member and forming test chambers with said casing and communicating with said central casing through individual window openings, a support for each of said test chambers facilitating the insertion of an air cooling unit to be tested into each chamber with its condenser in said central casing and its evaporator in said test chamber, and the window opening sealed against leakage, an electrical heater for each test chamber, and meter means for measuring the electrical input to each heater, and meter means for measuring the electrical input for driving each cooling unit, to determine the efficiency of each separate cooling unit, said meter means including automatic recording devices for each chamber, and said rotatable member having a common loading and unloading point for inserting the units to be tested and removing those that have been tested, and electric motor means having a driving shaft and provided with operative mechanical connections to drive said rotatable member at a slow speed, in which a predetermined amount of rotation of said rotatable member consumes the time required for a complete test of one air conditioning unit.

References Cited in the file of this patent

UNITED STATES PATENTS 2,715,359   Mackintosh _____ Aug. 16, 1955

OTHER REFERENCES

Refrigerating Engineering, February 1953, ASRE Standard 16–53, page 8, a publication of the American Society of Refrigeration Engineers, 40 W. 40th Street, New York 18, New York.

"Automatic Control of Heating and Air Conditioning," by Haines, published by McGraw-Hill Book Co., Inc., pages 314–317. (A copy (TH–7226 H3) is located in the Patent Office Library.)